US011586816B2

United States Patent
Hou et al.

(10) Patent No.: US 11,586,816 B2
(45) Date of Patent: Feb. 21, 2023

(54) CONTENT TAILORING FOR DIVERSE AUDIENCES

(71) Applicant: International Business Machines Corporation, Armonk, NY (US)

(72) Inventors: Yufang Hou, Dublin (IE); Pierpaolo Tommasi, Dublin (IE); Martin Gleize, Dublin (IE); Debasis Ganguly, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/345,157

(22) Filed: Jun. 11, 2021

(65) Prior Publication Data
US 2022/0398379 A1     Dec. 15, 2022

(51) Int. Cl.
*G06F 40/00*     (2020.01)
*G06F 40/253*    (2020.01)
*G06N 20/20*     (2019.01)
*G06F 3/0481*    (2022.01)
*G06F 40/169*    (2020.01)

(52) U.S. Cl.
CPC .......... *G06F 40/253* (2020.01); *G06F 3/0481* (2013.01); *G06F 40/169* (2020.01); *G06N 20/20* (2019.01)

(58) Field of Classification Search
CPC ............................ G06F 40/253; G06F 40/169
See application file for complete search history.

(56) References Cited

U.S. PATENT DOCUMENTS

| 9,002,178  | B2  | 4/2015  | Haberman |
|---|---|---|---|
| 9,020,956  | B1* | 4/2015  | Barr ..................... G06F 16/951  707/750 |
| 9,665,874  | B2  | 5/2017  | Chau |
| 9,792,908  | B1* | 10/2017 | Bassemir ............... G09B 19/04 |
| 9,928,514  | B2  | 3/2018  | Morgan |
| 10,380,236 | B1* | 8/2019  | Ganu .................... G06F 40/289 |
| 10,594,757 | B1* | 3/2020  | Shevchenko ........... G06F 40/35 |
| 10,922,483 | B1* | 2/2021  | Shevchenko ........... G06F 3/048 |
| 11,093,110 | B1* | 8/2021  | Bossio .................... G06F 40/44 |

(Continued)

FOREIGN PATENT DOCUMENTS

| EP | 3534318 A1    | 9/2019 |
|---|---|---|
| WO | 2020162833 A1 | 8/2020 |

OTHER PUBLICATIONS

Sequence-to-Sequence Pre-training with Data Augmentation for Sentence Rewriting, by Zhang et al., retrieved at https://arxiv.org/abs/1909.06002, published Sep. 20, 2019, 11 pages. (Year: 2019).*

(Continued)

*Primary Examiner* — Scott T Baderman
*Assistant Examiner* — Barbara M Level
(74) *Attorney, Agent, or Firm* — Edward J. Wixted, III

(57) ABSTRACT

Tailoring textual content to a target audience by receiving an input of a user, wherein the input of the user includes textual data, identifying a target audience of the textual data based at least in part on the input of the user, determining a style of the target audience, wherein the style is a variety of language used by the target audience, generating a modification recommendation to the textual data of the input of the user based at least in part on the textual data and the determined style.

13 Claims, 5 Drawing Sheets

(56) References Cited

U.S. PATENT DOCUMENTS

| | | | |
|---|---|---|---|
| 2007/0168863 A1* | 7/2007 | Blattner | G06F 3/011 715/706 |
| 2009/0070219 A1 | 3/2009 | D Angelo | |
| 2013/0268260 A1* | 10/2013 | Lundberg | G06F 11/3664 704/8 |
| 2015/0286619 A1* | 10/2015 | Chakra | G06F 40/253 704/9 |
| 2016/0063993 A1* | 3/2016 | Dolan | G06F 40/279 704/254 |
| 2016/0071162 A1* | 3/2016 | Ogawa | G06Q 50/01 705/14.66 |
| 2016/0078471 A1* | 3/2016 | Hamedi | G06F 16/90324 705/14.41 |
| 2016/0147760 A1* | 5/2016 | N | G06F 16/3322 707/751 |
| 2017/0109340 A1 | 4/2017 | Chen | |
| 2018/0006979 A1* | 1/2018 | Barsness | H04L 51/36 |
| 2018/0047038 A1 | 2/2018 | Deluca | |
| 2018/0063047 A1* | 3/2018 | Akselrod | H04L 51/063 |
| 2018/0203847 A1* | 7/2018 | Akkiraju | G06F 40/253 |
| 2019/0026601 A1* | 1/2019 | Packalen | G06K 9/6253 |
| 2019/0147009 A1 | 5/2019 | Bastide | |
| 2019/0205372 A1* | 7/2019 | Li | G06N 20/00 |
| 2019/0236139 A1* | 8/2019 | DeFelice | G06N 3/0445 |
| 2019/0370336 A1* | 12/2019 | Prakash | G06F 40/30 |
| 2020/0004820 A1* | 1/2020 | Chhaya | G06F 40/30 |
| 2020/0327189 A1* | 10/2020 | Li | G06F 40/56 |
| 2020/0364303 A1* | 11/2020 | Liu | G10L 15/1815 |
| 2020/0387914 A1 | 12/2020 | Rathod | |
| 2021/0034705 A1* | 2/2021 | Chhaya | G06N 3/0445 |
| 2021/0157880 A1* | 5/2021 | Verma | G06F 40/253 |
| 2021/0248687 A1* | 8/2021 | Albert | H04L 67/306 |
| 2021/0326528 A1* | 10/2021 | Kemp | H04L 67/306 |

OTHER PUBLICATIONS

"I Was So Tired Of Hearing About Meal Kits, But I Gave One A Shot", trueself, printed from the Internet on Jun. 2, 2021, 9 pps., <https://www.aclweb.org/anthology/2020.acl-main.703.pdf>.

Chawla et al., "Generating summaries tailored to target characteristics", 15 pps., <https://theultramarine19.github.io/data/PCO.pdf>.

Devlin et al., "BERT: Pre-training of Deep Bidirectional Transformers for Language Understanding", Proceedings of NAACL-HLT 2019, pp. 4171-4186, Minneapolis, Minnesota, Jun. 2-Jun. 7, 2019. c 2019 Association for Computational Linguistics, <https://www.aclweb.org/anthology/N19-1423.pdf>.

Keskar et al., "CTRL: A Conditional Transformer Language Model for Controllable Generation", arXiv:1909.05858v2 [cs.CL], Sep. 20, 2019, 18 pps.

Krishna et al., "Reformulating Unsupervised Style Transfer as Paraphrase Generation", EMNLP 2020, arXiv:2010.05700v1 [cs.CL] Oct. 12, 2020, 26 pps.

Ma et al., "PowerTransformer: Unsupervised Controllable Revision for Biased Language Correction", EMNLP 2020, arXiv:2010.13816V1 [cs.CL] Oct. 26, 2020, 16 pps.

Madaan et al., "Politeness Transfer: A Tag and Generate Approach", ACL 2020, arXiv:2004.14257v2 [cs.CL] May 1, 2020, 13 pps.

Mell et al., "The NIST Definition of Cloud Computing", National Institute of Standards and Technology, U.S. Department of Commerce, NIST Special Publication 800-145, Sep. 2011, 7 pages.

Scarton et al., "Learning Simplifications for Specific Target Audiences", Proceedings of the 56th Annual Meeting of the Association for Computational Linguistics (Short Papers), pp. 712-718 Melbourne, Australia, Jul. 15-20, 2018. c 2018 Association for Computational Linguistics, <https://www.aclweb.org/anthology/P18-2113.pdf>.

Sudhakar et al., "Transforming Delete, Retrieve, Generate Approach for Controlled Text Style Transfer", arXiv:1908.09368V1 [cs.CL], Aug. 25, 2019, EMNLP 2019, 11 pps.

\* cited by examiner

CONTENT TAILORING FOR DIVERSE AUDIENCES

BACKGROUND

The disclosure relates generally to natural language generation. The disclosure relates particularly to tailoring textual content to a target audience.

Natural language processing (NLP) is a subfield of linguistics, computer science, and artificial intelligence (AI) concerned with the interactions between computers and human language, in particular how to program computers to process and analyze large amounts of natural language data. The result is a computer capable of "understanding" the contents of documents, including the contextual nuances of the language within them. The technology can then accurately extract information and insights contained in the documents as well as categorize and organize the documents themselves.

Natural-language generation (NLG) is a software process that produces natural language output. NLG can be compared to the process humans use when they turn ideas into writing or speech. Psycholinguists prefer the term language production for this process, which can also be described in mathematical terms, or modeled in a computer for psychological research. NLG systems can also be compared to translators of artificial computer languages, such as decompilers or transpilers, which also produce human-readable code generated from an intermediate representation.

SUMMARY

The following presents a summary to provide a basic understanding of one or more embodiments of the disclosure. This summary is not intended to identify key or critical elements or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatuses and/or computer program products enable tailoring textual content to a target audience.

Aspects of the invention disclose methods, systems and computer readable media associated with tailoring textual content to a target audience by receiving an input of a user, wherein the input of the user includes textual data, identifying a target audience of the textual data based at least in part on the input of the user, determining a style of the target audience, wherein the style is a variety of language used by the target audience, generating a modification recommendation to the textual data of the input of the user based at least in part on the textual data and the determined style.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
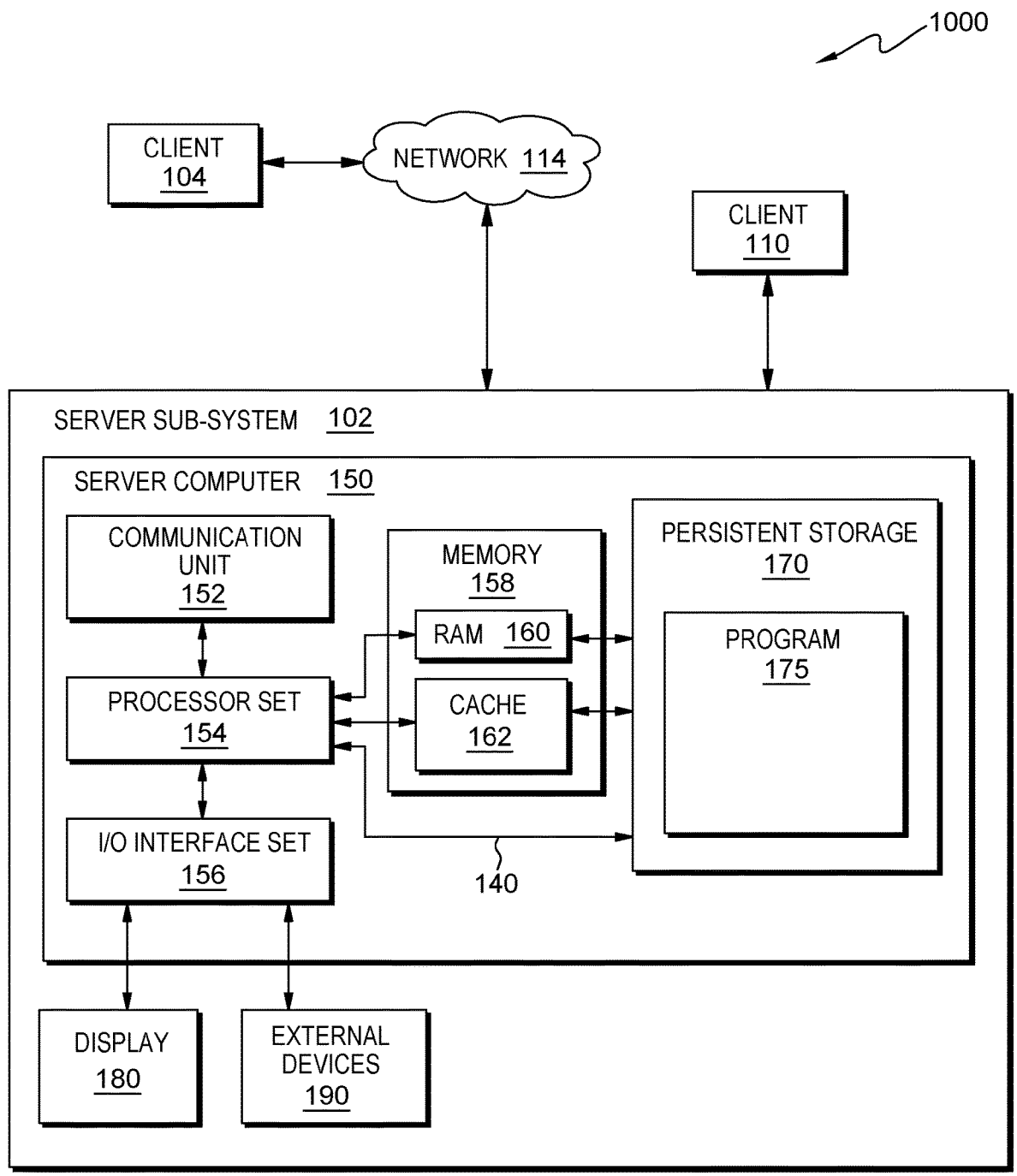
FIG. 1 provides a schematic illustration of a computing environment, according to an embodiment of the invention.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

Embodiments of the present disclosure recognize that challenges exist in users' abilities to tailor text for audiences that users are less confident with such as the audiences not being in the users' domain of knowledge, the users and audiences belonging to much different demographics, etc. Such challenges may result in users failing to grow their reputation, user satisfaction, and/or visibility on social networks due to audience disconnect. Embodiments of the present disclosure aide users by generating artificial intelligence (AI) driven tailored content through recommending edits to the content to target diverse audiences. An embodiment of the present disclosure utilizes available online data (e.g., social platforms or news) to train an AI model to modify a style of text. For example, collecting existing post and metadata from online platforms to train one or more AI models about different audiences and associated posting patterns/style. User-generated text content is input into the AI model that analyzes the text content and outputs recommended edits to the text content for target audiences and, additionally, collects feedback data to continue training the AI model. In this example, text content from the user and descriptors about target audience are received as input, and the AI model is used to fit the input text to the target audience and provide the input text to output. Additionally, the user edits on the output text are collected and used as output text feedback data to further train the AI model.

In an embodiment, one or more components of the system can employ hardware and/or software to solve problems that are highly technical in nature (e.g., collecting existing post and metadata from online platforms to train one or more AI models about different audiences and associated posting patterns/style, etc.). These solutions are not abstract and cannot be performed as a set of mental acts by a human due to the processing capabilities needed to facilitate receiving an input of a user, wherein the input of the user includes textual data, for example. Further, some of the processes performed may be performed by a specialized computer for carrying out defined tasks related to generating a modification recommendation to the textual data of the input of the user based at least in part on the textual data and the determined style. For example, a specialized computer can be employed to carry out tasks related to generating a modification recommendation to the textual data of the input of the user based at least in part on the textual data and the determined style or the like.

Implementation of embodiments of the invention may take a variety of forms, and exemplary implementation details are discussed subsequently with reference to the Figures.

In an embodiment, a system executing the tailoring textual content to a target audience method collects textual data to generate a text corpus to train a first machine learning model (i.e., style transfer model) based on an encoder-decoder framework (e.g., Bidirectional and Auto-Regressive Transformers (BART)). For example, the first machine learning model is a multi-task model that performs the functions of a second machine learning model and third machine learning model, which are discussed below in greater detail. The method collects textual data of social networks that a user authorizes (e.g., provides user credentials) the method to access. The method may collect textual data for training purposes through method such as, but not limited to, crawling social networks or blogs, using existing machine leaning (ML) systems or knowledge bases/ontologies, etc. In this embodiment, the method compiles the collected raw textual data into a text corpus for the purpose of training the first machine learning model.

In an embodiment, the method utilizes a second machine learning model (i.e., author characteristic classification model) and a generated text corpus, as discussed above, to generate a set of training data for a first machine learning model (i.e., style transfer model). The method can utilize the second machine learning model to identify sentences of the generated corpus with various audience attributes (i.e., named entity recognition (NER) task) of the sentences. Additionally, the method can determine a sentiment classification of the sentences of the generated corpus and/or comments of feedback data. The audience attributes can include features (e.g., descriptors) such as age demographics, occupation/educational backgrounds, etc. In this embodiment, the method can train the second machine learning model based on a sequence classification framework (e.g., Bidirectional Encoder Representations from Transformers (BERT)). For example, the method can create a training set from the generated text corpus and annotate (e.g., label) sentences of the training set with audience attributes for target audiences for the second machine learning model. As a result, the second machine learning model outputs a set of sentences with the corresponding labels (e.g., audience attributes, sentiments, etc.) and the method utilizes the outputs of the remainder of the generated text corpus to create a labelled sentence corpus.

In another embodiment, the method converts the sentence labelled corpus to a uniform style using a back-translation technique. The method can utilize a third machine learning model (i.e., paraphrase generation model) to convert the labelled sentence corpus to a uniform style. In this embodiment, the method can input sentences of the sentence labelled corpus into the third machine learning model that outputs a corpus of parallel sentences that have a uniform style. For example, the method first trains the third machine learning model on parallel data (e.g., datasets of paired sentences in both the source and target language), which is used to translate the target textual data into the source language. The result is a parallel corpus where the source side is synthetic machine translation output while the target is genuine text written by users. The synthetic parallel corpus is then simply added to the real bitext in order to train a final system that will translate from the source to the target language. The method can tokenize each sentence of the parallel corpus that correspond to audience attributes of the output of the second machine learning model (i.e., the training data generated as described above contains parallel sentences of different styles (e.g., audience attributes)).

In an embodiment, the method utilizes outputs of the second and third machine learning models to train a first machine learning model (e.g., style transfer model) on a generated set of training data. The method trains (e.g., pretrains) the first machine learning model by corrupting documents (e.g., the parallel corpus) and then optimizing a reconstruction loss—the cross-entropy between the decoder's output and the original document. Additionally, unlike existing denoising autoencoders, which are tailored to specific noising schemes, the first machine learning model allows the method to apply any type of document corruption (e.g., token masking, token deletion, text infilling, sentence permutation, document rotation etc.), resulting in the first machine learning model transferring a user input to a targeted audience (e.g., style). For example, the method can use the first machine learning model for classification problems, a user input (e.g., text, descriptors, etc.) is fed into the encoder and decoder, and the representation from the final output (e.g., sentence of different styles) is used. In this example, a style is a single or a combination of different audience attributes. Additionally, the method can utilize user selected style edits and feedback data (e.g., number of likes, comments, sentiment analysis on the comments, natural language processing (NLP) on comments, etc.) of the posted textual data to continuously retrain the first machine learning algorithm.

In an embodiment, the method obtains a user input from a computing device of a user. The method receives an input of a user from a computing device of a user. For example, the input of the user are selections made by the user utilizing a graphical user interface (GUI) of the computing device. The user inputs can include textual data provided by the user and descriptors and of a target audience of the provided textual data.

In an embodiment, the method identifies a target audience of textual data. The method receives a selection of one or more descriptors of a GUI by a user that indicate attributes associated with an audience of the user. In the embodiment, the method utilizes attributes of the audience to determine a style associated with the selected audience. In various embodiments of the present disclosure a style is a set of linguistic variants with specific social meanings, which can include group membership, personal attributes, or beliefs. For example, style is the particular variety of language used by different individuals and/or in different situations or settings. In this example, the vernacular, or everyday language may be used among casual friends, whereas more formal language, with respect to grammar, pronunciation or accent, and lexicon or choice of words, is often used in a cover letter and résumé and while speaking during a job interview.

In an embodiment, the method determines a style of a target audience corresponding to an input of a user. The method inputs data corresponding to user inputs (e.g., descriptors) into a first machine learning model that identifies audiences and associated styles of the audiences corresponding to the user inputs. Additionally, the associated styles can correspond to knowledge bases of posting styles (e.g., syntax, punctuation, emojis, etc.) and/or ontologies (e.g., phrases, jargon, slang, vocabulary, etc.) associated with descriptors of the audiences.

In an embodiment, the method generates a modification recommendation to the textual data of an input of a user. The method extracts textual data and descriptors of a target audience from a user input. In this embodiment, the method inputs the textual data and descriptors from the user input into a first machine learning model. The method selects one or more outputs of the first machine learning model that include one or more modified versions of the textual data that comply with a style corresponding to one or more descriptors of the target audience. For example, the method selects one or more modified sentences output by a style transfer model (e.g., first machine learning model). In this example, the one or more modified sentences can include the input textual data modified to include jargon, grammar, and phrases corresponding to a style or pattern of the target audience. Additionally, the method transmits the one or more modified versions of the textual data to a computing device of the user.

In an embodiment, the method identifies a user selection of a modification recommendation of textual data. The method can receive a notification from a computing device of the user of edited textual data the user accepts and incorporates into a text for posting to a social network. The method may also monitor posts of a social media account to identify a post of a user that corresponds to the modification recommendation. In this embodiment, the method collects feedback data corresponding to the user selection of modification recommendations. For example, the method can collect recommended modifications (e.g., edits) to textual data that a user selects and/or metadata from an online platform (e.g., social networks) corresponding to the modified textual data. The metadata can include sentiment of response comments, likes, the comments, etc. Additionally, the method can utilize the collected feedback data to continue to train (e.g., fine tune) the first machine learning model.

FIG. 1 provides a schematic illustration of exemplary network resources associated with practicing the disclosed inventions. The inventions may be practiced in the processors of any of the disclosed elements which process an instruction stream. As shown in the figure, a networked Client device 110 connects wirelessly to server sub-system 102. Client device 104 connects wirelessly to server subsystem 102 via network 114. Client devices 104 and 110 comprise application program (not shown) together with sufficient computing resource (processor, memory, network communications hardware) to execute the program.

As shown in FIG. 1, server sub-system 102 comprises a server computer 150. FIG. 1 depicts a block diagram of components of server computer 150 within a networked computer system 1000, in accordance with an embodiment of the present invention. It should be appreciated that FIG. 1 provides only an illustration of one implementation and does not imply any limitations with regard to the environments in which different embodiments can be implemented. Many modifications to the depicted environment may be made by those skilled in the art without departing from the scope of the invention as recited by the claims.

The present invention may contain various accessible data sources, such as server computer 150, client device 104, and client device 110, that may include personal data, content, or information the user wishes not to be processed. Personal data includes personally identifying information or sensitive personal information as well as user information, such as tracking or geolocation information. Processing refers to any, automated or unautomated, operation or set of operations such as collection, recording, organization, structuring, storage, adaptation, alteration, retrieval, consultation, use, disclosure by transmission, dissemination, or otherwise making available, combination, restriction, erasure, or destruction performed on personal data. Program 175 enables the authorized and secure processing of personal data. Program 175 provides informed consent, with notice of the collection of personal data, allowing the user to opt in or opt out of processing personal data. Consent can take several forms. Opt-in consent can impose on the user to take an affirmative action before personal data is processed. Alternatively, opt-out consent can impose on the user to take an affirmative action to prevent the processing of personal data before personal data is processed. Program 175 provides information regarding personal data and the nature (e.g., type, scope, purpose, duration, etc.) of the processing. Program 175 provides the user with copies of stored personal data. Program 175 allows the correction or completion of incorrect or incomplete personal data. Program 175 allows the immediate deletion of personal data.

Server computer 150 can include processor(s) 154, memory 158, persistent storage 170, communications unit 152, input/output (I/O) interface(s) 156 and communications fabric 140. Communications fabric 140 provides communications between cache 162, memory 158, persistent storage 170, communications unit 152, and input/output (I/O) interface(s) 156. Communications fabric 140 can be implemented with any architecture designed for passing data and/or control information between processors (such as microprocessors, communications and network processors, etc.), system memory, peripheral devices, and any other hardware components within a system. For example, communications fabric 140 can be implemented with one or more buses.

Memory 158 and persistent storage 170 are computer readable storage media. In this embodiment, memory 158 includes random access memory (RAM) 160. In general, memory 158 can include any suitable volatile or non-volatile computer readable storage media. Cache 162 is a fast memory that enhances the performance of processor(s) 154 by holding recently accessed data, and data near recently accessed data, from memory 158.

Program instructions and data used to practice embodiments of the present invention, e.g., program 175, are stored in persistent storage 170 for execution and/or access by one or more of the respective processor(s) 154 of server computer 150 via cache 162. In this embodiment, persistent storage 170 includes a magnetic hard disk drive. Alternatively, or in addition to a magnetic hard disk drive, persistent storage 170 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 170 may also be removable. For example, a removable hard drive may be used for persistent storage 170. Other examples include optical and magnetic disks, thumb drives, and smart cards that are inserted into a drive for transfer onto another computer readable storage medium that is also part of persistent storage 170.

Communications unit 152, in these examples, provides for communications with other data processing systems or devices, including resources of client computing devices 104, and 110. In these examples, communications unit 152 includes one or more network interface cards. Communications unit 152 may provide communications through the use of either or both physical and wireless communications links. Software distribution programs, and other programs and data used for implementation of the present invention, may be downloaded to persistent storage 170 of server computer 150 through communications unit 152.

I/O interface(s) 156 allows for input and output of data with other devices that may be connected to server computer 150. For example, I/O interface(s) 156 may provide a connection to external device(s) 190 such as a keyboard, a keypad, a touch screen, a microphone, a digital camera, and/or some other suitable input device. External device(s)

190 can also include portable computer readable storage media such as, for example, thumb drives, portable optical or magnetic disks, and memory cards. Software and data used to practice embodiments of the present invention, e.g., program 175 on server computer 150, can be stored on such portable computer readable storage media and can be loaded onto persistent storage 170 via I/O interface(s) 156. I/O interface(s) 156 also connect to a display 180.

Display 180 provides a mechanism to display data to a user and may be, for example, a computer monitor. Display 180 can also function as a touch screen, such as a display of a tablet computer.

Figure 2:
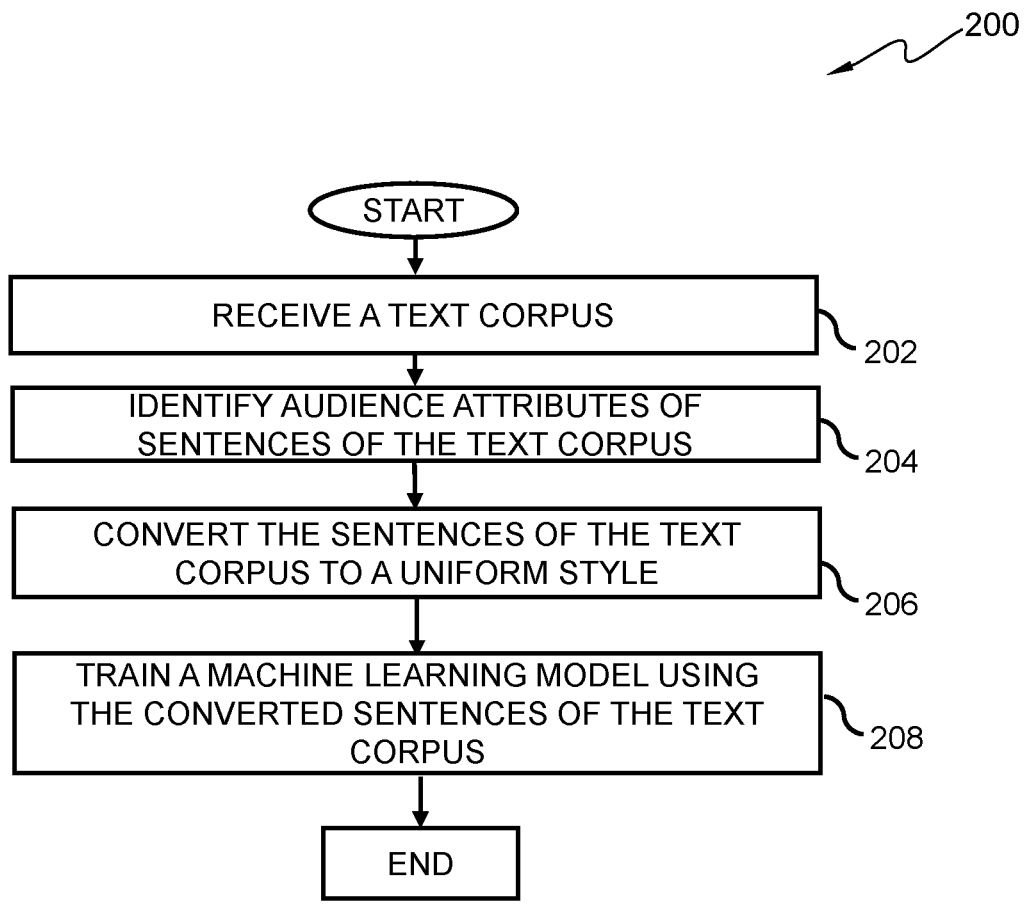
FIG. 2 provides a flowchart depicting an operational sequence, according to an embodiment of the invention.

FIG. 2 provides a flowchart 200, illustrating exemplary activities associated with the practice of the disclosure. In one embodiment, program 175 initiates in response to a user connecting client device 104 to program 175 through network 114. For example, program 175 initiates in response to a user registering (e.g., opting-in) a laptop (e.g., client device 104) with program 175 via a WLAN (e.g., network 114). In another embodiment, program 175 is a background application that continuously monitors client device 104. For example, program 175 is a client-side application that initiates upon booting of a laptop (e.g., client device 104) of a user and monitors data of the laptop.

After program start, at block 202, the method of program 175 receives a text corpus. In an embodiment, program 175 receives a text corpus corresponding to a user of client device 104. In another embodiment, program 175 generates a text corpus corresponding to a user by collecting textual data of one or more social network platforms via network 114.

At block 204, the method of program 175, identifies an audience attribute of sentences of the text corpus. In an embodiment, program 175 inputs the generated text corpus corresponding to the user into a second machine learning model trained to perform NER and/or sentiment analysis tasks. In this embodiment, program 175 generates a labelled set of sentences (e.g., labelled dataset) from an output of the second machine learning model corresponding to the generated text corpus.

At block 206, the method of program 175, converts the sentence of the text corpus to uniform style. In an embodiment, program 175 passes the labelled set of sentences to a third machine learning model trained to convert textual data to a uniform style. In this embodiment, program 175 generates a set of training data for the first machine learning model from the output of the third machine learning model corresponding to the labelled set of sentences (e.g., labelled dataset).

At block 208, the method of program 175, trains a machine learning model using the converted sentences of the text corpus. In an embodiment, program 175 inputs the set of training data into the first machine learning model and collects sentences the first machine learning model outputs. In this embodiment, program 175 fine-tunes and/or retrains the first machine learning model utilizing an input sequence (e.g., original phrase), a target sequence (e.g., paraphrased sentence), and collected feedback data.

Figure 3:
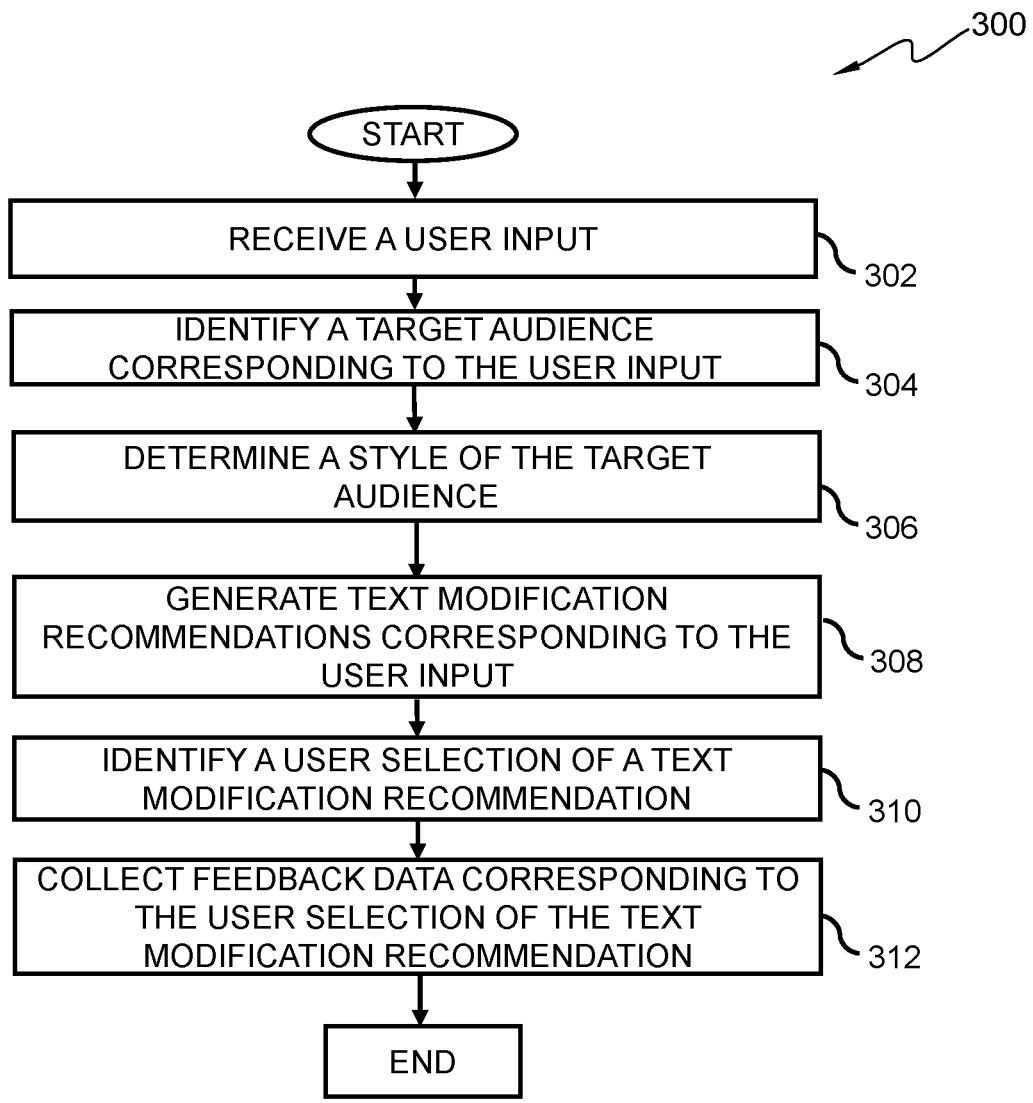
FIG. 3 provides a flowchart depicting an operational sequence, according to an embodiment of the invention.

FIG. 3 provides a flowchart 300, illustrating exemplary activities associated with the practice of the disclosure. In one embodiment, program 175 initiates in response to a user connecting client device 104 to program 175 through network 114. For example, program 175 initiates in response to a user registering (e.g., opting-in) a laptop (e.g., client device 104) with program 175 via a WLAN (e.g., network 114). In another embodiment, program 175 is a background application that continuously monitors client device 104. For example, program 175 is a client-side application that initiates upon booting of a laptop (e.g., client device 104) of a user and monitors data of the laptop.

After program start, at block 302, the method of program 175 receives user input. In an embodiment, program 175 receives a text corpus corresponding to a user of client device 104. In another embodiment, program 175 receives a text corpus corresponding to a user from memory 158.

At block 304, the method of program 175, identifies a target audience corresponding to the user input. In an embodiment, program 175 extracts textual data corresponding to one or more descriptors of a target audience that a user provides to client device 104. In this embodiment, program 175 generates a set of data inputs corresponding to the one or more descriptors of the target audience of the user.

At block 306, the method of program 175, determines a style of the target audience. In an embodiment, program 175 inputs a set of data inputs corresponding to the target audience into a first machine learning model to identify a style of an audience of a user of client device 104. In this embodiment, program 175 utilizes the first machine learning model to correlate one or more descriptors of the set of data inputs with one or more styles of a target audience.

At block 308, the method of program 175, generates text modification recommendations correspond to the user input. In an embodiment, program 175 inputs textual data a user provides to client device 104 into a first machine learning model, which transforms the textual data using one or more styles associated with a target audience of one or more descriptors of a set of data inputs. In this embodiment, program 175 selects one or more outputs of the first machine learning model as text modification recommendations and transmits the selected outputs to client device 104.

At block 310, the method of program 175, identifies a user selection of a text modification recommendation. In an embodiment, program 175 receives a confirmation of a user selection of a text modification recommendation from client device 104. In this embodiment, program 175 stores textual data corresponding to the user selection in memory 158.

At block 312, the method of program 175, collects feedback data corresponding to the user selection of the text modification recommendation. In an embodiment, program 175 collects data corresponding to the user selection from social networks through network 114 and stores the collected data in memory 158. In this embodiment, program 175 utilizes the collected data of memory 158 to retrain the first machine learning model.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
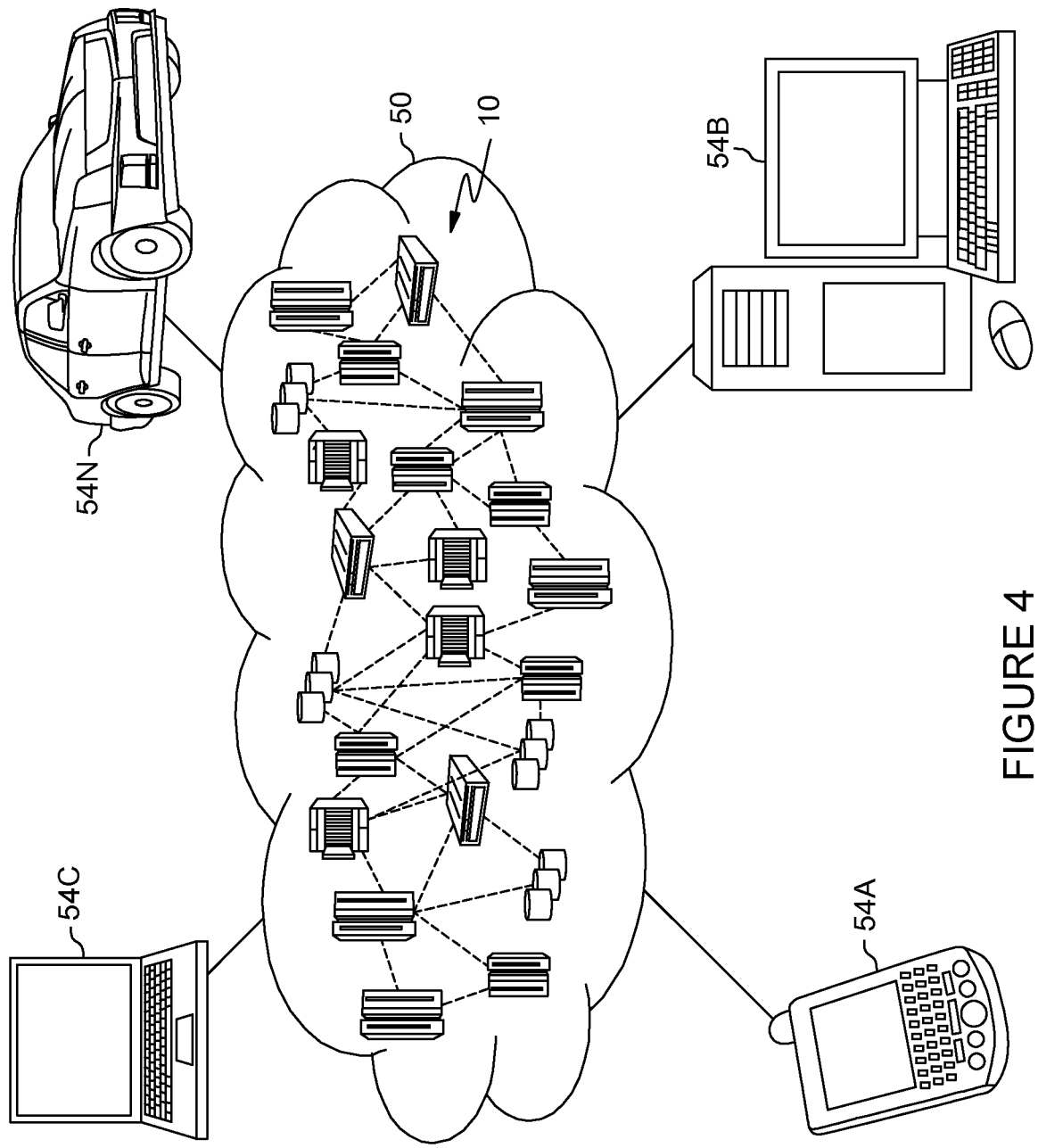
FIG. 4 depicts a cloud computing environment, according to an embodiment of the invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
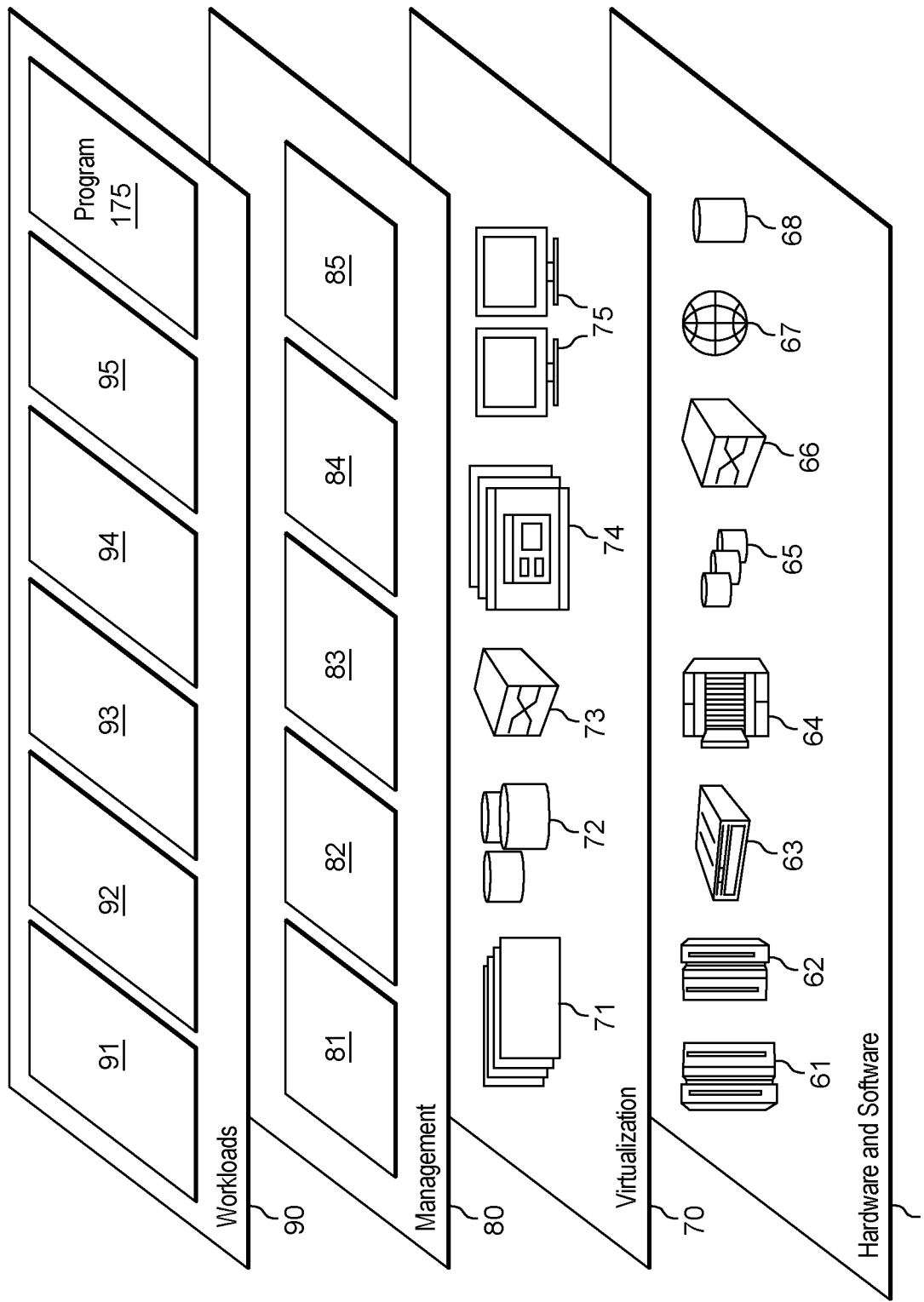
FIG. 5 depicts abstraction model layers, according to an embodiment of the invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and program 175.

The present invention may be a system, a method, and/or a computer program product at any possible technical detail level of integration. The invention may be beneficially practiced in any system, single or parallel, which processes an instruction stream. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, or computer readable storage device, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions collectively stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer implemented method comprising:
receiving, by one or more processors, an input of a user, wherein the input of the user includes textual data for posting to a social media platform and a descriptor about a target audience;
identifying, by one or more processors, the target audience on the social media platform of the textual data based at least in part on the descriptor;
determining, by one or more processors, a style of the target audience, wherein the style is a variety of language used by the target audience;
generating, by one or more processors, a modification recommendation to the textual data of the input of the user based at least in part on the textual data and the determined style, wherein generating the modification recommendation further comprises:
generating, by one or more processors, a sentence corpus based on a set of sentences of output of a first machine learning model, wherein:
the first machine learning model is trained to perform named entity recognition (NER) and sentiment analysis; and
generating the sentence corpus further comprises converting, by one or more processors, the set of sentences of the output of the first machine learning model to a uniform style using a back-translation process;
training, by one or more processors, a second machine learning model using the sentence corpus;
inputting, by one or more processors, the input of the user into the second machine learning model, wherein the input of the user includes the textual data and the target audience; and
selecting, by one or more processors, one or more outputs of the second machine learning model, wherein the one or more outputs correspond to instances of the textual data modified for the target audience;
identifying, by one or more processors, that posted social media content of the user includes the modification recommendation to the textual data;
receiving, by one or more processors, a number of likes of the posted social media content; and
retraining, by one or more processors, the second machine learning model based on the number of likes of the posted social media content.

2. The computer implemented method of claim 1, further comprising:
generating, by one or more processors, a set of training data for the second machine learning model, wherein generating the set of training data further comprises:
annotating, by one or more processors, sentences of a first segment of a text corpus with labels that correspond to attributes of one or more target audiences;
training, by one or more processors, the first machine learning model using the first segment of the text corpus; and
inputting, by one or more processors, a second segment of the text corpus into the first machine learning model, wherein an output of the first machine learning model is a set of sentences with labels corresponding to attributes of one or more target audiences.

3. The computer implemented method of claim 2, further comprising:
training, by one or more processors, the second machine learning model using the sentence corpus, wherein the second machine learning model outputs the textual data of the input of the user that is modified based on the determined style of the target audience.

4. The computer implemented method of claim 1, further comprising:
identifying, by one or more processors, a user selection to modify the textual data based on the modification recommendation; and
collecting, by one or more processors, feedback data corresponding to the modified textual data.

5. The computer implemented method of claim 1, wherein the descriptor about the target audience comprises an educational background.

6. A computer program product comprising:
one or more computer readable storage devices and collectively stored program instructions on the one or more computer readable storage devices, the stored program instructions comprising:
- program instructions to receive an input of a user, wherein the input of the user includes textual data for posting to a social media platform and a descriptor about a target audience;
- program instructions to identify the target audience on the social media platform of the textual data based at least in part on the descriptor;
- program instructions to determine a style of the target audience, wherein the style is a variety of language used by the target audience;
- program instructions to generate a modification recommendation to the textual data of the input of the user based at least in part on the textual data and the determined style, wherein program instructions to generate the modification recommendation further comprise:
  - program instructions to generate a sentence corpus based on a set of sentences of output of a first machine learning model, wherein:
    - the first machine learning model is trained to perform named entity recognition (NER) and sentiment analysis; and
    - program instructions to generate the sentence corpus further comprise program instructions to convert the set of sentences of the output of the first machine learning model to a uniform style using a back-translation process;
  - program instructions to train a second machine learning model using the sentence corpus;
  - program instructions to input the input of the user into the second machine learning model, wherein the input of the user includes the textual data and the target audience; and
  - program instructions to select one or more outputs of the second machine learning model, wherein the one or more outputs correspond to instances of the textual data modified for the target audience;
- program instructions to identify that posted social media content of the user includes the modification recommendation to the textual data;
- program instructions to receive a number of likes of the posted social media content; and
- program instructions to retrain the second machine learning model based on the number of likes of the posted social media content.

7. The computer program product of claim 6, the stored program instructions further comprising:
- program instructions to generate a set of training data for the second machine learning model, wherein generating the set of training data further comprises:
  - program instructions to annotate sentences of a first segment of a text corpus with labels that correspond to attributes of one or more target audiences;
  - program instructions to train the first machine learning model using the first segment of the text corpus; and
  - program instructions to input a second segment of the text corpus into the first machine learning model, wherein an output of the first machine learning model is a set of sentences with labels corresponding to attributes of one or more target audiences.

8. The computer program product of claim 7, the stored program instructions further comprising:
- program instructions to train the second machine learning model using the sentence corpus, wherein the second machine learning model outputs the textual data of the input of the user that is modified based on the determined style of the target audience.

9. The computer program product of claim 6, the stored program instructions further comprising:
- program instructions to identify a user selection to modify the textual data based on the modification recommendation; and
- program instructions to collect feedback data corresponding to the modified textual data.

10. A computer system comprising:
- one or more computer processors;
- one or more computer readable storage devices; and
- stored program instructions on the one or more computer readable storage devices for execution by the one or more computer processors, the stored program instructions comprising:
  - program instructions to receive an input of a user, wherein the input of the user includes textual data for posting to a social media platform and a descriptor about a target audience;
  - program instructions to identify the target audience on the social media platform of the textual data based at least in part on the descriptor;
  - program instructions to determine a style of the target audience, wherein the style is a variety of language used by the target audience;
  - program instructions to generate a modification recommendation to the textual data of the input of the user based at least in part on the textual data and the determined style, wherein program instructions to generate the modification recommendation further comprise:
    - program instructions to generate a sentence corpus based on a set of sentences of output of a first machine learning model, wherein:
      - the first machine learning model is trained to perform named entity recognition (NER) and sentiment analysis; and
      - program instructions to generate the sentence corpus further comprise program instructions to convert the set of sentences of the output of the first machine learning model to a uniform style using a back-translation process;
    - program instructions to train a second machine learning model using the sentence corpus;
    - program instructions to input the input of the user into the second machine learning model, wherein the input of the user includes the textual data and the target audience; and
    - program instructions to select one or more outputs of the second machine learning model, wherein the one or more outputs correspond to instances of the textual data modified for the target audience;
  - program instructions to identify that posted social media content of the user includes the modification recommendation to the textual data;
  - program instructions to receive a number of likes of the posted social media content; and
  - program instructions to retrain the second machine learning model based on the number of likes of the posted social media content.

11. The computer system of claim 10, the stored program instructions further comprising:
- program instructions to generate a set of training data for the second machine learning model, wherein generating the set of training data further comprises:

program instructions to annotate sentences of a first segment of a text corpus with labels that correspond to attributes of one or more target audiences;

program instructions to train the first machine learning model using the first segment of the text corpus; and program instructions to input a second segment of the text corpus into the first machine learning model, wherein an output of the first machine learning model is a set of sentences with labels corresponding to attributes of one or more target audiences.

12. The computer system of claim 11, the stored program instructions further comprising:

program instructions to train the second machine learning model using the sentence corpus, wherein the second machine learning model outputs the textual data of the input of the user that is modified based on the determined style of the target audience.

13. The computer system of claim 10, the stored program instructions further comprising:

program instructions to identify a user selection to modify the textual data based on the modification recommendation; and program instructions to collect feedback data corresponding to the modified textual data.

* * * * *